United States Patent [19]

Kamaya

[11] Patent Number: 4,714,223
[45] Date of Patent: Dec. 22, 1987

[54] MOUNTING DEVICE FOR FOG LAMP

[75] Inventor: Masashi Kamaya, Tokyo, Japan

[73] Assignee: PIAA Corporation, Tokyo, Japan

[21] Appl. No.: 921,441

[22] Filed: Oct. 22, 1986

[51] Int. Cl.⁴ .............................................. E04G 3/00
[52] U.S. Cl. .................................... 248/291; 248/284;
403/87; 403/159
[58] Field of Search ............... 248/291, 284, 286, 474,
248/479, 484, 485, 486, 487, 447, 900, 481;
403/159, 157, 79, 87

[56] References Cited

U.S. PATENT DOCUMENTS

| 182,388 | 9/1876 | Spring | 403/159 X |
| 3,102,353 | 9/1963 | Kies | 248/291 X |
| 3,235,214 | 2/1966 | Strung | 248/291 X |
| 4,108,462 | 8/1978 | Martin | 248/286 X |
| 4,520,984 | 6/1985 | Rouleau | 248/900 X |
| 4,623,115 | 11/1986 | Brester | 248/479 |

Primary Examiner—Ramon O. Ramirez
Attorney, Agent, or Firm—Oblon, Fisher, Spivak, McClelland & Maier

[57] ABSTRACT

A mounting device for a fog lamp including a support mounted at an approximate position on a vehicle; rounded protrusions formed on the two sides of the support; a pair of rotating parts having rounded depressions engageable with the protrusions; and a pair of bolts swivelingly connecting the parts with the support; the above-mentioned rotating parts acting a bridges to affix the frame of the fog lamp.

3 Claims, 5 Drawing Figures

4,714,223

MOUNTING DEVICE FOR FOG LAMP

BACKGROUND OF THE INVENTION

1. Field of the Invention

The present invention relates to a mounting device of a fog lamp which is mounted on a vehicle and is lit up during rain, fog, and the like.

2. Description of the Related Art

In the prior art, the method of mounting, as shown in FIG. 1, has usually been to simply support and affix a hook (1) fixed to the vehicle bumper or the like to a hook (2) suspended from the bottom side of the fog lamp by bolts and nuts (3). This type of fog lamp, however, is usually mounted at the very front of a vehicle, so any slight carelessness will often result in the fog lamp striking some obstacle.

In such a case, with the conventional mounting means as shown in FIG. 1, the fog lamp swivels backward in the event of direct frontal impact so as to avoid damage, but no buffer means has been devised for impact on the fog lamp from the lateral direction, so the mount or the fog lamp itself would be damaged. In particular, fog lamps have recently been increasingly mounted under the bumper and thus there has been increased frequency of impact to the fog lamp from the lateral direction. Further, when mounting such a fog lamp on a bumper, etc., it is difficult to mount it to be completely parallel with the bumper and there is often inevitably a slant. In the prior art device, this was difficult to immediately correct.

SUMMARY OF THE INVENTION

The present invention features formation of bowl-shaped protrusions on the two sides of a support mounted at an appropriate position on a vehicle, swiveling connection of a pair of rotating parts having bowl-shaped depressions engageable with the protrusions to the support, and affixment of these rotating parts to the frame of the fog lamp, so that even if force is exerted on the frame from the lateral direction, the above-mentioned protrusions and depressions swivel at the engagement faces to enable the fog lamp itself to slant, thus eliminating any fear of damage. Further, the above-mentioned swiveling faces comprise contact between the bowl-shaped protrusions and depressions, so there is no detachment of the engagement portions or slowed down motion due to rust, etc. Motion in the left, right, front, or rear directions is relatively easy, so it is easy to mount the fog lamp on a parallel line with the bumper, resulting in good efficiency during mounting work.

In addition, the present invention features the provision of a plurality of small protrusions on the surface of one of each of the above-mentioned bowl-shaped protrusions or bowl-shaped depressions. By making them soft, the respective engagement portions feature point contact, so the sliding motion is smooth and there is little accumulation of rainwater or other corrosion factors.

BRIEF DESCRIPTION OF THE DRAWINGS

The features and advantages of the present invention will be clearly appreciated from the foregoing description and drawings, in which the same reference numerals designate the corresponding elements and in which.

DESCRIPTION OF THE PREFERRED EMBODIMENTS

Figure 1:
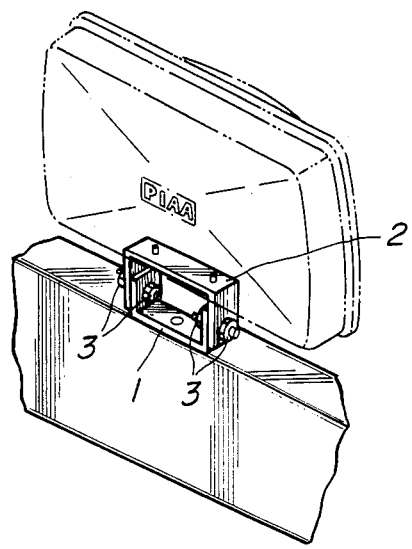
FIG. 1 is a perspective explanatory view of a prior art device.
Figure 2:
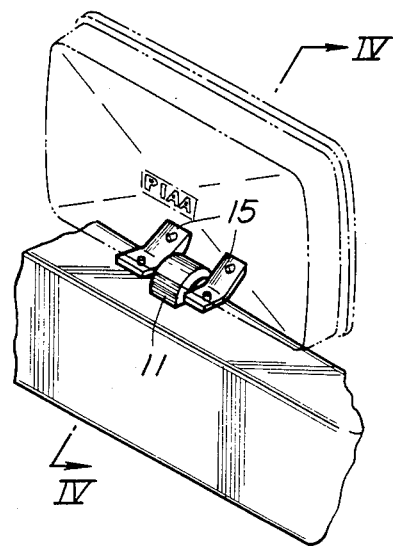
FIG. 2 is a perspective view of a device according to an embodiment of the present invention.
Figure 3:
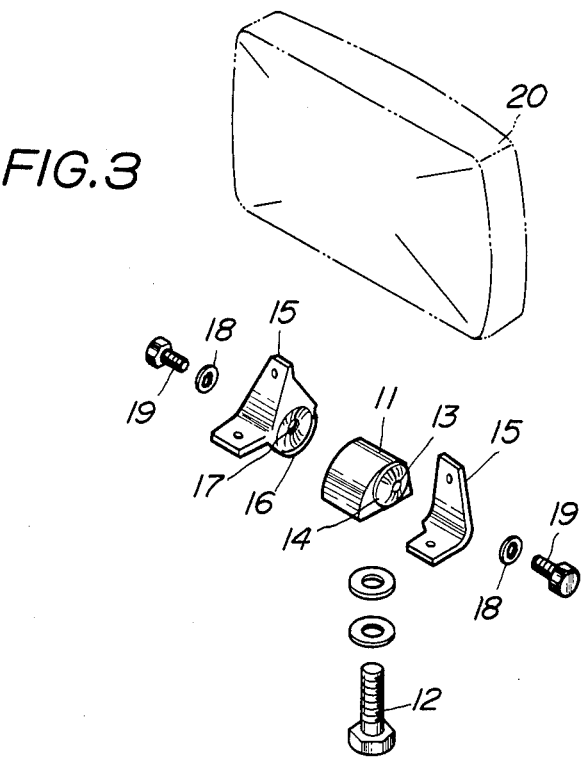
FIG. 3 is a disassembled perspective explanatory view.
Figure 4:
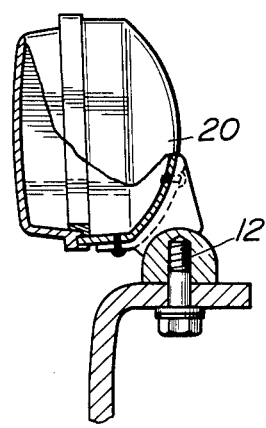
FIG. 4 is a sectional view taken along line IV—IV of FIG. 2.

Embodiments of the above present invention are explained with reference to FIG. 2 and on. In the figure, (11) is a support which is mounted to a bumper of a vehicle, etc., with bolts (12), etc. It has an inside threaded hole (13) penetrating therethrough along its horizontal axis. The support (11) has formed on its two sides bowl-shaped protrusions (14). Reference numerals (15) shown a pair of rotating parts which are roughly L-shaped in cross-section and are disposed to the right and left of the support (11). On the respective opposing faces of the same are formed bowl-shaped depressions (16) which can engage with the protrusions (14) of the above-mentioned support (11). Also, through holes (17) are formed, at positions centered on the depressions (16), so as to be on the axis of said support (11). Bolts (19) are passed through these through holes (17) from the outside, via washers (17), and screwed into the above-mentioned threaded hole (13) to support the support (11). The through holes (17) of the rotating parts (15) are given diameters larger than the diameter of said bolts (19) so that the existence of the bolts will not cause any trouble when the rotating parts (15) swivel.

Thereafter, the frame (20) of the fog lamp is affixed to the pair of rotating parts (15) by an appropriate method. With the mounting device of this embodiment, even if the fog receives force from the front of the vehicle or lateral direction, the rotating parts (15) swivel on the contacting surfaces of the protrusions 14 and the rotating parts (15), that is, the contact surfaces of the bowl-shaped protrusions (14) and depressions (16), and the fog lamp slants, whereby there is little danger of damage. When restoring the lamp to its original state, the lamp can easily be returned to its former position by hand. This enables ready setting to a position parallel with the bumper, etc. and thus results in good work efficiency too.

Figure 5:
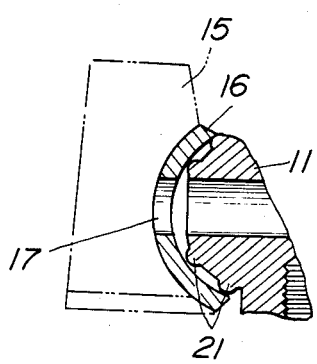
FIG. 5 is an explanatory view showing the protrusion of the support of another embodiment.

Incidentally, as shown in FIG. 5, of one of each of the depressions (16) of the aforementioned rotating parts (15) or the protrusions (14) of the support (11) (in the figure, the depressions (16) have provided on their surfaces a plurality of small projections (21), the respective contact surfaces of the same would comprise roughly point contact, which would enable smooth swiveling motion of the rotating parts (15) and would prevent in advance accumulation of rainwater at the contact portions and thus a factor causing rusting.

Obviously, numerous modifications and variations of the present invention are possible in light of the above teachings. It is therefore to be understood that within the scope of the appended claims, the invention may be practiced otherwise than as specifically described herein.

What is claimed is:

1. A mounting device for a fog lamp having a frame and comprising:

a support mounted on a vehicle, said support including rounded protrusions formed on opposite sides thereof;

a pair of rotating parts having rounded depressions engageable with the protrusions; and a pair of bolts swivelingly connecting said pair of rotating parts with said support wherein said pair of rotating parts are connected to said frame of the fog lamp.

2. A mounting device for a fog lamp according to claim 1, wherein:

wherein each of said depressions includes a plurality of projections for contacting said protrusions of said support.

3. A mounting device for a fog lamp according to claim 1, wherein said protrusions each include a plurality of projections for contacting said depressions.

* * * * *